United States Patent
Shibamoto

(10) Patent No.: US 9,425,712 B2
(45) Date of Patent: Aug. 23, 2016

(54) VIBRATION POWER-GENERATING STRAIN WAVE GEARING

(75) Inventor: Yusuke Shibamoto, Azumino (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 406 days.

(21) Appl. No.: 14/343,339

(22) PCT Filed: Sep. 16, 2011

(86) PCT No.: PCT/JP2011/005259
§ 371 (c)(1),
(2), (4) Date: Mar. 6, 2014

(87) PCT Pub. No.: WO2013/038463
PCT Pub. Date: Mar. 21, 2013

(65) Prior Publication Data
US 2014/0217855 A1 Aug. 7, 2014

(51) Int. Cl.
*H01L 41/113* (2006.01)
*H02N 2/18* (2006.01)
*F16H 49/00* (2006.01)

(52) U.S. Cl.
CPC .............. *H02N 2/18* (2013.01); *F16H 49/001* (2013.01)

(58) Field of Classification Search
CPC ........ H02N 2/18; H02N 2/183; H02N 2/186; H01L 41/1136
USPC .......................................................... 310/339
See application file for complete search history.

(56) References Cited

U.S. PATENT DOCUMENTS

| 2,686,882 A | * | 8/1954 | Mallinckrodt | F23Q 2/287 310/333 |
| 2002/0121844 A1 | * | 9/2002 | Ghandi | H02N 2/18 310/339 |
| 2012/0007473 A1 | * | 1/2012 | Oh | H02N 2/18 310/339 |

FOREIGN PATENT DOCUMENTS

| JP | 63-023570 A | 1/1988 |
| JP | 02-41692 U | 3/1990 |
| JP | 02-129436 A | 5/1990 |
| JP | 02-261944 A | 10/1990 |
| JP | 2006-083905 A | 3/2006 |
| JP | 2007-071242 A | 3/2007 |

OTHER PUBLICATIONS

International Search Report (PCT/ISA/210) mailed on Nov. 15, 2011, by the Japanese Patent Office as the International Searching Authority for International Application No. PCT/JP2011/005259.

* cited by examiner

*Primary Examiner* — Thomas Dougherty
(74) *Attorney, Agent, or Firm* — Buchanan Ingersoll & Rooney PC

(57) ABSTRACT

The strain wave gearing includes a rigid internally toothed gear, a flexible externally toothed gear that is disposed coaxially therein and is flexible in the radial direction, and a wave generator that is disposed coaxially inside the externally toothed gear. The flexible externally toothed gear is bent in the radial direction by the wave generator and meshes with the rigid internally toothed gear in sections. When the position of meshing of the rigid internally toothed gear with the flexible externally toothed gear moves in the circumferential direction as the wave generator rotates, a relative rotation that corresponds to the difference in number of teeth of the two gears is generated between the two gears. A vibration-powered generator is disposed on the flexible externally toothed gear. The vibration-powered generator is provided with a piezoelectric element.

12 Claims, 5 Drawing Sheets

VIBRATION POWER-GENERATING STRAIN WAVE GEARING

TECHNICAL FIELD

The present invention relates to a strain wave gearing for generating electric power through vibration utilizing a flexing motion of a flexible externally toothed gear being repeatedly flexed for a speed-reducing operation.

BACKGROUND ART

A strain wave gearing typically has an annular rigid internally toothed gear, a flexible externally toothed gear disposed coaxially therein, and a wave generator fitted further therein. There are flexible externally toothed gears called "flat-shaped," "cup-shaped," and "silk hat-shaped." A flat-shaped flexible externally toothed gear has a configuration in which the external teeth are formed on a circular outer perimeter surface of a flexible cylindrical part. Cup-shaped and silk hat-shaped flexible externally toothed gears have a flexible cylindrical part, a disk-form diaphragm extending in the radial direction from the rear end of the cylindrical part, and external teeth formed on a portion of the outer perimeter surface on a front end opening side of the cylindrical part. The portion of the front end opening side of the cylindrical part of the flexible externally toothed gear is flexed by the wave generator in a noncircular, generally ellipsoidal form, and the external teeth engage with the internal teeth of the internally toothed gear at both ends in the major axis direction of the ellipsoidal curve.

In a cup-shaped flexible externally toothed gear, the diaphragm extends inward in the radial direction from the cylindrical part, and a boss is integrally formed on an inner perimeter edge of the diaphragm. In a silk hat-shaped flexible externally toothed gear, the diaphragm spreads outward in the radial direction from the cylindrical part, and an annular boss is integrally formed on an outer perimeter edge of the diaphragm.

In a flexible externally toothed gear of any shape, the cylindrical part where the external teeth are formed is repeatedly flexed in the radial direction by the wave generator. In a cup-shaped or silk hat-shaped flexible externally toothed gear, the portion of the front end opening side where the external teeth are formed on the cylindrical part is ellipsoidally flexed by the wave generator. Therefore, in the ellipsoidally flexed state when cut in cross section including the major axis of the ellipsoidal curve, the amount of flexing of the cylindrical part of the flexible externally toothed gear gradually increases from the diaphragm-side end to the front end opening following the tooth trace direction of the external teeth. Conversely, when cut in cross section including the minor axis of the ellipsoidal curve, the amount of flexing gradually decreases from the diaphragm-side end to the front end opening. Accordingly, a flexing motion called "coning," in which the front end opening-side is repeatedly flexed outward and inward in the radial direction centered on the diaphragm-side end, occurs on each portion of the flexible externally toothed gear accompanying rotation of the wave generator.

The wave generator for ellipsoidally flexing the flexible externally toothed gear generally has a structure in which a cam plate including a rigid body having an ellipsoidal contour is fitted by way of ball bearings into front end opening of the cylindrical part of the flexible externally toothed gear. The ball bearings are called "wave bearings," and an outer wheel and an inner wheel thereof can flex in the radial direction. There is also known a wave generator that is configured so that the flexible externally toothed gear is ellipsoidally flexed using a piezoelectric element instead of a cam plate having an ellipsoidal contour. Strain wave gearings having this form of wave generator are disclosed in patent documents 1 and 2.

Meanwhile, there is also known and described in patent document 2 a friction-coupling strain wave apparatus for performing a decelerating operation using the same principle as a strain wave gearing. In this kind of friction-coupling strain wave apparatus as well, a flexible ring thereof is flexed in the radial direction by a wave generator, and each part of the flexible ring is repeatedly flexed in the radial direction accompanying rotation of the wave generator.

PRIOR ART DOCUMENTS

Patent Documents

[Patent document 1] JP-A 02-261944
[Patent document 2] JP-A_2007-71242

DISCLOSURE OF THE INVENTION

Problems to be Solved by the Invention

Portions of the flexible externally toothed gear of the strain wave gearing and of the flexible ring of the friction-coupling strain wave apparatus thus are repeatedly flexed in the radial direction by the wave generator. The present invention was created with particular focus on the flexing motion of the flexible externally toothed gear and of the flexible ring, and an object thereof is to provide a strain wave gearing and a friction-coupling strain wave apparatus that can generate power utilizing the flexing motion of the flexible externally toothed gear and of the flexible ring.

Means to Solve the Problems

In order to achieve the abovementioned object, according to the present invention, a strain wave gearing having an annular rigid internally toothed gear, a flexible externally toothed gear that is disposed coaxially on an inside of the rigid internally toothed gear and is capable of flexing in a radial direction thereof, and a wave generator that is disposed coaxially on an inside of the flexible externally toothed gear; the flexible externally toothed gear being flexed in the radial direction by the wave generator and partially engaging with the rigid internally toothed gear; and, when a position at which the rigid internally toothed gear and the flexible externally toothed gear engage moves in a circumferential direction thereof as the wave generator rotates, the gears rotating relative to each other in correspondence to a difference between a number of teeth of each of the gears, wherein the strain wave gearing is characterized in that:

a vibration-powered generator is disposed in the flexible externally toothed gear; and the vibration-powered generator generates electric power by the flexing motion of the flexible externally toothed gear, which is repeatedly flexed as the wave generator rotates.

The vibration-powered generator used here can be a piezoelectric element utilizing a piezoelectric effect, an element utilising variation of electrostatic capacitance, or an element utilizing electromagnetic induction. With any of these elements, a variation of flexing, electrostatic capacitance, or magnetic force is repeatedly brought about in the element by the flexing motion of the flexible externally toothed gear being repeatedly flexed accompanying rotation of the wave generator, and power is generated.

When the flexible externally toothed gear is of a flat profile, for example, one end or both ends of the portion where the external teeth are formed on the cylindrical part may be elongated in the axial direction, and the piezoelectric element or other power-generating element may be attached to the elongated portion so that the repetitive strain, or the like, fluctuates accompanying the flexing motion of the cylindrical part. In the case of a cup-shaped or silk hat-shaped flexible externally toothed gear, the piezoelectric element or other power-generating element may be attached to a location of at least either one of the cylindrical part and the diaphragm of the flexible externally toothed gear. A piezoelectric element when used is desirably affixed to the outer perimeter surface of the cylindrical part of the flexible externally toothed gear when considering operating characteristics, and the like. In order to increase the amount of power generated, the power-generating element is desirably attached to the entirety of the cylindrical part rather than one location on the cylindrical part.

Because wiring is drawn out from the power-generating element, desirably, the flexible externally toothed gear where the power-generating element is attached is supported so as not to rotate and the rigid internally toothed gear is supported to rotate freely, and reduction-speed rotational output is extracted from the rigid internally toothed gear.

The usage mode of the strain wave gearing is often such that the time in which the wave generator is driven to rotate at a constant continuous rotational speed is short and stable power generation is difficult. The frequency of flexing fluctuation in the flexing motion of the flexible externally toothed gear may be low, and the power generation efficiency of the power-generating element may be low. Therefore, desirably, a electric power storage unit for storing electric power generated by the vibration-powered generator is disposed and electric power is stored so that stable electric power can be output from the electric power storage unit.

Next, the present invention is applicable also to a friction-coupling strain wave apparatus. Specifically, a friction-coupling strain wave apparatus of the present invention having a rigid ring that has a circular inner perimeter surface used as a first friction-coupling surface, a flexible ring that is disposed coaxially on the inside of the rigid ring and has a circular outer perimeter surface used as a second friction-coupling surface, and a wave generator that is disposed coaxially on the inside of the flexible ring; the flexible ring being flexed in the radial direction by the wave generator and partially friction-coupling with the rigid ring; and, when the position of friction-coupling of both rings moves in the circumferential direction as the wave generator rotates, the rings rotating relative to each other in correspondence to the difference in circumferential length of the friction-coupling surfaces of both rings; wherein the friction-coupling strain wave apparatus is characterized in that:

a vibration-powered generator is disposed in the flexible ring; and the vibration-powered generator generates electric power by a flexing motion of the flexible ring, which is repeatedly flexed as the wave generator rotates.

In this case as well, the vibration-powered generator used can be a piezoelectric element utilizing a piezoelectric effect, an element utilizing variation of electrostatic capacitance, or an element utilizing electromagnetic induction. With any of these elements, the strain, electrostatic capacitance, or magnetic force of the element repeatedly fluctuates by the flexing motion of the flexible ring being repeatedly flexed accompanying rotation of the wave generator, and power is generated.

When the flexible ring is of a flat profile, for example, one end or both ends of the portion where the second friction-coupling surface is formed on the cylindrical part are elongated in the axial direction, and the piezoelectric element or other power-generating element is attached to the elongated portion so that the repetitive strain, or the like, fluctuates accompanying the flexing motion of the cylindrical part. In the case of a cup-shaped or silk hat-shaped flexible ring, the piezoelectric element or other power-generating element can be attached to at least one location between the cylindrical part and the diaphragm of the flexible ring. A piezoelectric element when used is desirably affixed to a portion of the outer perimeter surface of the cylindrical part other than the friction-coupling surface on the flexible ring when considering operating characteristics, and the like. In order to increase the amount of power generated, the power-generating element is desirably attached to the entirety of the cylindrical part rather than one location on the cylindrical part.

Because wiring is drawn out from the power-generating element, desirably, the flexible ring where the power-generating element is attached is supported so as not to rotate and the rigid ring is supported to rotate freely, and decelerated rotational output is extracted from the rigid ring.

The method for using the wave apparatus is often such that the time in which the wave generator is driven to rotate at a constant continuous rotational speed is short and stable electric power generation is difficult. The frequency of flexing in the flexing motion of the flexible ring may be low, and the power generation efficiency of the power-generating element may be low. Desirably, an electric power storage unit for storing electric power generated by the vibration-powered generator is disposed and electric power is stored so that stable electric power can be output from the electric power storage unit.

Effect of the Invention

The strain wave gearing of the present invention is provided with a vibration-powered generator having a piezoelectric element or other power-generating element for generating electric power utilizing the flexing motion of the cylindrical part of the flexible externally toothed gear. A strain wave gearing having a power-generating function accordingly can be realized inexpensively with a very simple configuration. A friction-coupling strain wave apparatus having a power-generating function likewise can be realized inexpensively with a very simple configuration.

MODE FOR CARRYING OUT THE INVENTION

Embodiment 1

Figure 1:
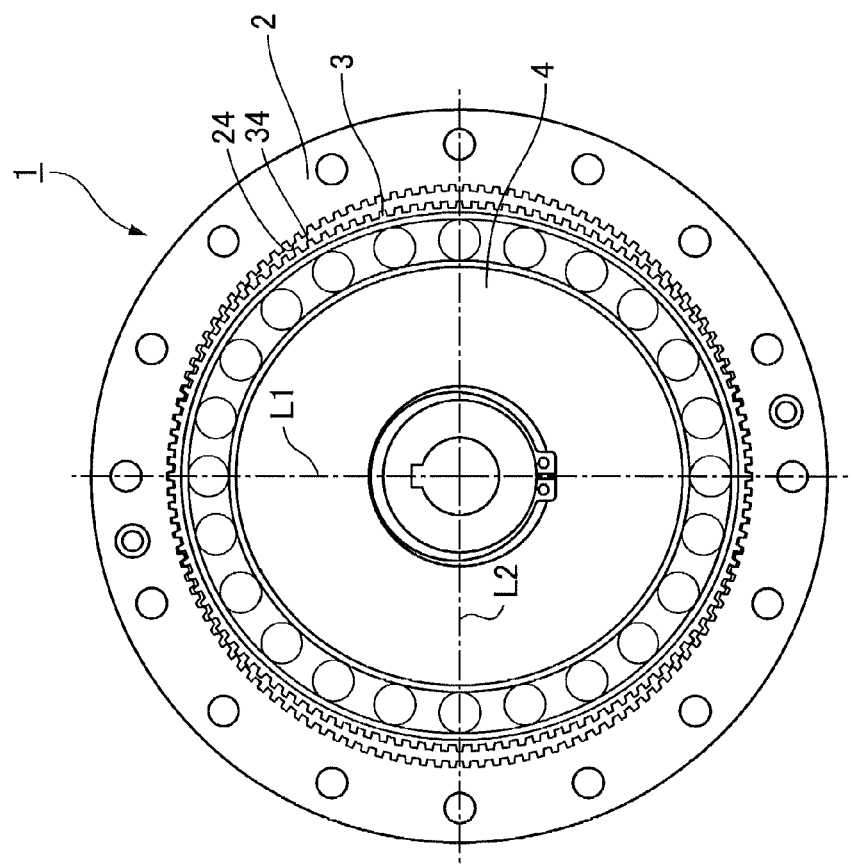
FIG. 1(a) and FIG. 1(b) A schematic diagram and front view of a cup-type strain wave gearing in which the present invention is applied.
Figure 1:
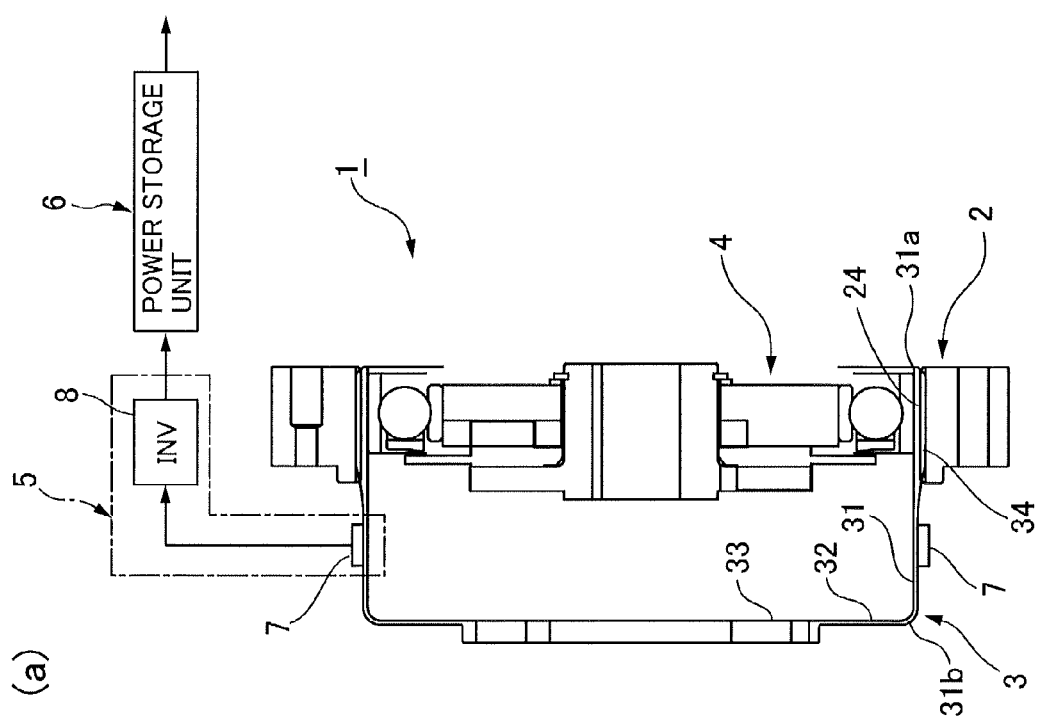

FIG. 1(a) is a schematic diagram illustrating a cup-type strain wave gearing according to embodiment 1 in which the present invention is applied, and FIG. 1(b) is a schematic front view thereof. As illustrated in these drawings, a strain wave gearing 1 has an annular rigid internally toothed gear 2, a flexible externally toothed gear 3 disposed inside the gear 2, and a wave generator 4 having an ellipsoidal contour being fitted inside the gear 3. The rigid internally toothed gear 2 and the flexible externally toothed gear 3 both are flat gears having module m. The tooth number difference of the two gears is 2 n (n is a positive integer), in the present example 2 (n=1), and the rigid internally toothed gear 2 has the larger number. The flexible externally toothed gear 3 is ellipsoidally flexed by the wave generator 4 having an ellipsoidal contour, and the external teeth 34 thereof engage with the internal teeth 24 of the rigid internally toothed gear 2 in the portions at both ends in the direction of the major axis L1 of the ellipsoidal form.

When the wave generator 4 rotates, the position of engagement of the two gears 2 and 3 moves in the circumferential direction, and a relative rotation corresponding to the tooth number difference of the two gears occurs between the two gears 2 and 3. In the present example, the wave generator 4 is connected and fixed to a motor not illustrated, the flexible externally toothed gear 3 is fixed to a fixed-side member not illustrated and is supported so as not to rotate, and the rigid internally toothed gear is fixed to a load-side member not illustrated. The high-speed input rotation input from the wave generator 4 is extracted as reduce-speed rotational output from the rigid internally toothed gear 2, and is transmitted to the load-side member not illustrated.

The flexible externally toothed gear 3 is cup shaped, and is provided with a flexible cylindrical part 31, a disk-form diaphragm 32 continuing on the rear end 31b thereof and spreading inward in the radial direction, an annular boss 33 continuing on the inner perimeter edge of the diaphragm 32, and external teeth 34 formed on a portion of the outer perimeter surface on the side of a front end opening 31a of the cylindrical part 31. The wave generator 4 having an ellipsoidal contour is fitted inside the portion where the external teeth are formed inside the front end opening 31a of the cylindrical part 31 of the flexible externally toothed gear 3. The amount of flexing outward or inward in the radial direction of the cylindrical part 31 being ellipsoidally flexed by the wave generator 4 gradually increases from the rear end 31b on the side of the diaphragm to the front end opening 31a.

A vibration-powered generator 5 is disposed on the flexible externally toothed gear 3, and a power storage unit 6 for storing electric power generated by the vibration-powered generator 5 is connected to the vibration-powered generator. Electric power can be supplied from the power storage unit 6. The vibration-powered generator 5 is provided with a piezoelectric element 7 that is displaced to generate electric power by the flexing motion of the flexible externally toothed gear 3 being repetitively flexed accompanying rotation of the wave generator 4. The piezoelectric element 7 is affixed to a portion of the outer perimeter surface adjacent to the side of the diaphragm 32 relative to the external teeth 34 on the cylindrical part 31 of the flexible externally toothed gear 3, so as to flex integrally with the portion of the outer perimeter surface. For example, a plurality of piezoelectric elements 7 is affixed in the circumferential direction on the portion of the outer perimeter surface.

Figure 2:
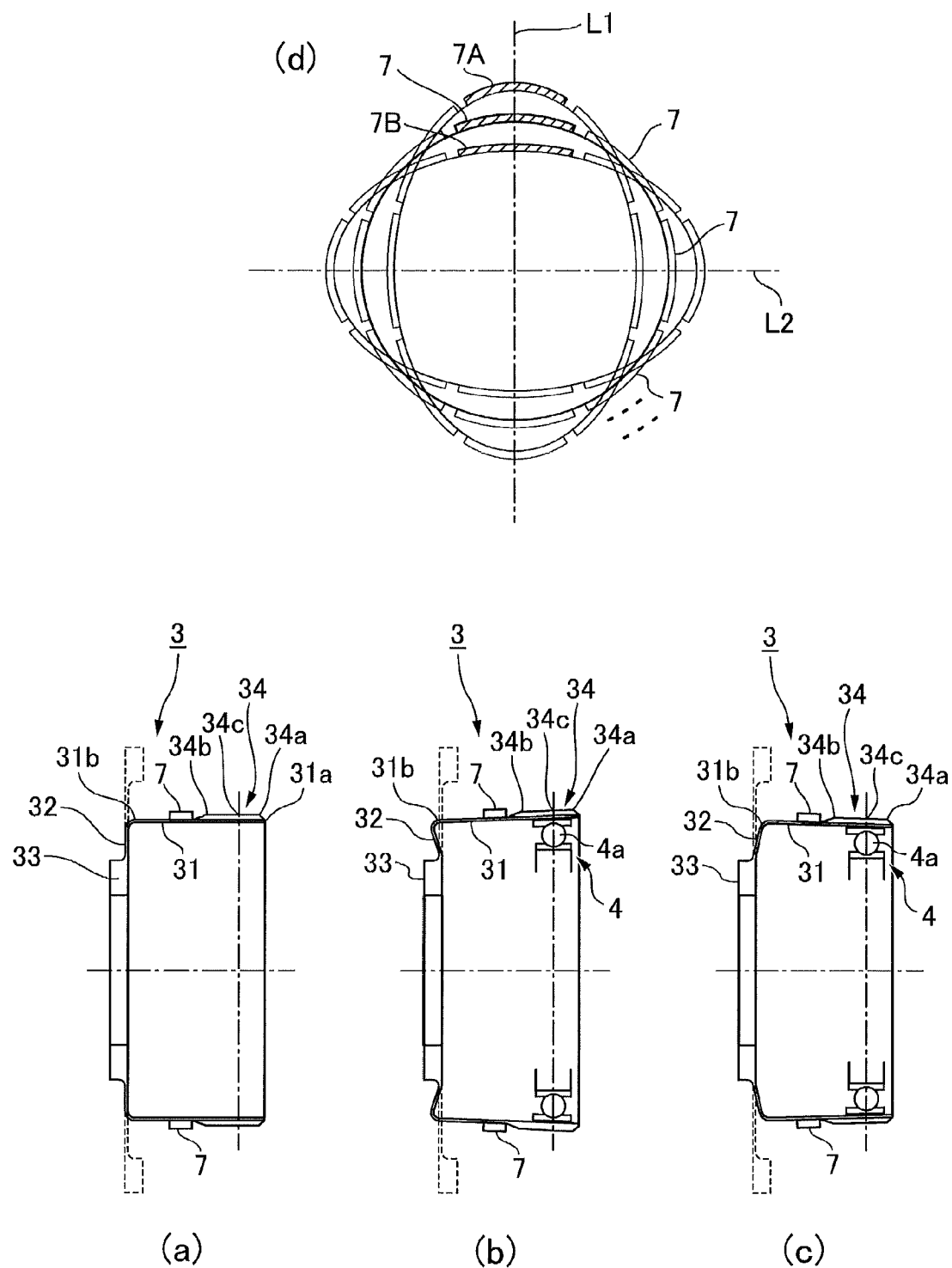
FIG. 2 Schematic diagrams illustrating the state of flexing of the flexible externally toothed gear of the strain wave gearing of FIG. 1, in which (a) illustrates the state in the longitudinal section of the flexible externally toothed gear before deformation, (b) illustrates the state in the longitudinal section at a position including the major axis of the ellipsoidally deformed flexible externally toothed gear, (c) illustrates the state in the longitudinal section at a position including the minor axis of the ellipsoidally deformed flexible externally toothed gear, and (d) illustrates in an exaggerated manner the state of flexing of the flexible externally toothed gear at the position where the piezoelectric element is affixed.

FIG. 2 is an explanatory view illustrating the condition of flexing of the flexible externally toothed gear 3 of the strain wave gearing 1. FIG. 2(a) illustrates the state in longitudinal section of the flexible externally toothed gear 3 before deformation, FIG. 2(b) illustrates the state in longitudinal section at a position including the major axis of the ellipsoidally deformed flexible externally toothed gear 3, FIG. 2(c) illustrates the state in longitudinal section at a position including the minor axis of the ellipsoidally deformed flexible externally toothed gear 3, and FIG. 2(d) illustrates in an exaggerated manner the state of flexing of the flexible externally toothed gear 3 at the position where the piezoelectric element is affixed. The solid lines in FIGS. 2(a) to (c) indicate a cup-shaped flexible externally toothed gear 3, and the broken lines indicate a silk hat-shaped flexible externally toothed gear illustrated in FIG. 4 to be described.

At the cross-sectional position including the major axis L1 of the ellipsoidal curve in the cylindrical part 31, the amount of flexing outward gradually increases roughly proportionally to the distance from the rear end 31b to the front end opening 31a as illustrated in FIG. 2(b). At the cross-sectional position including the minor axis L2 of the ellipsoidal curve, the amount of flexing inward gradually increases roughly proportionally to the distance from the rear end 31b to the front end opening 31a as illustrated in FIG. 2(c).

Accordingly, with respect also to the external teeth 34 formed on the portion of the outer perimeter surface on the front end opening 31a side of the cylindrical part 31, the amount of flexing varies in each section perpendicular to the cone axis in the tooth trace direction thereof. Specifically, from the rear end 34b on the diaphragm side in the tooth trace direction of the external teeth 34 to the front end 34a on the front end opening 31a side, the amount of flexing gradually increases proportionally to the distance from the rear end 31b within the cross section including the major axis L1 of the ellipsoidal curve.

Here, a circle passing through the center in the thickness direction of the tooth bottom rim of the external teeth 34 before being ellipsoidally flexed in a section perpendicular to the cone axis at any position in the tooth trace direction of the external teeth 34 is called a "rim neutral circle"; a curve passing through the center in the thickness direction of the tooth bottom rim after being ellipsoidally flexed is called a "ellipsoidal rim neutral line"; and the amount of flexing in the direction of the major axis relative to the rim neutral circle at the major axis position of the ellipsoidal rim neutral line is 2 κmn, where κ is a flexing coefficient.

Specifically, $Z_F$ is the number of teeth of the external teeth 34 of the flexible externally toothed gear 3, $Z_C$ is the number of teeth of the internal teeth 24 of the rigid internally toothed gear, and R $(=Z_F/(Z_C-Z_F)=Z_F/2\,n)$ is the speed reduction ratio of the strain wave gearing 1, and the normal amount of flexing $w_O$ in the direction of the major axis is the value ($mZ_F/R=2$ mn) having divided the pitch circle diameter $mZ_F$ of the flexible externally toothed gear 3 by the speed reduction ratio R. The strain wave gearing 1 is generally designed so as to flex by the normal amount of flexing (=2 mn) at the position of the ball center of the wave bearing of the wave generator 4 in the tooth trace direction of the flexible externally toothed gear 3. The flexing coefficient κ expresses the value having divided the amount of flexing w in each section perpendicular to the cone axis in the tooth trace direction of the flexible externally toothed gear 3 by the normal amount of flexing. Accordingly, in the external teeth 34, the flexing coefficient at the position where the normal amount of flexing is obtained is κ=1, the flexing coefficient of a cross-sectional position having a lesser amount of flexing w is κ<1, and the flexing coefficient of a cross-sectional position having a greater amount of flexing w is κ>1.

As illustrated in FIG. 2(d), the portion of the outer perimeter surface of the flexible externally toothed gear 3 where the piezoelectric element 7 is affixed is repeatedly flexed in the radial direction accompanying rotation of the wave generator 4. Accordingly, each piezoelectric element 7 also is repeatedly flexed in the radial direction accompanying the flexing motion of the cylindrical part 31, and electric power is therefore generated by a piezoelectric effect. For example, when considering one piezoelectric element 7, the element is repeatedly flexed from a state of maximum curvature 7A to a state of minimum curvature 7B, and electric power is generated accompanying this flexing. The electric current generated by the piezoelectric element 7 is converted to DC current by way of an inverter 8, for example, and is then supplied to and stored in the power storage unit 6 (see FIG. 1).

The stored electric power can be utilized as a portion of the drive power of the motor for rotationally driving the wave generator 4, and can be utilized as an emergency power source. Or, the electric power can be utilized as a power source for driving various kinds of sensors when the sensors are mounted on the strain wave gearing 1. The strain wave gearing 1 can furthermore be used as a manual power generation apparatus for emergencies, and the like, if the wave generator is configured to be capable of rotational driving by manual operation.

Figure 3:
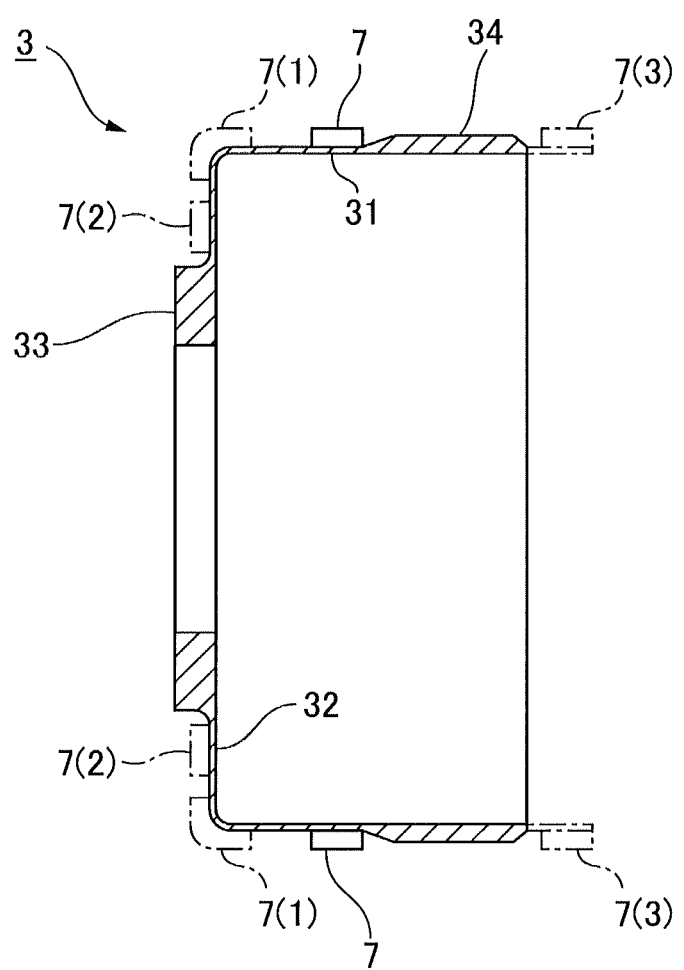
FIG. 3 A schematic diagram illustrating the position where the piezoelectric element is attached in a cup-shaped flexible externally toothed gear.

The positions where the piezoelectric elements 7 are affixed on the flexible externally toothed gear 3 can also be positions different from those in the present example. For example, piezoelectric elements 7 can be attached to a portion 7(1) of the outer perimeter surface from the cylindrical part 31 to the diaphragm 32, and a portion 7(2) of the surface of the diaphragm 32, as illustrated in FIG. 3. Or, the front end of the cylindrical part 31 can be extended forward from the external teeth 34, and the circular outer perimeter surface or circular inner perimeter surface of this extended portion can be used as a portion 7(3) where a piezoelectric element 7 is attached. Piezoelectric elements 7 can furthermore be attached to the circular inner perimeter surface of the cylindrical part 31 and the surface inside the diaphragm 32.

Embodiment 2

Figure 4:
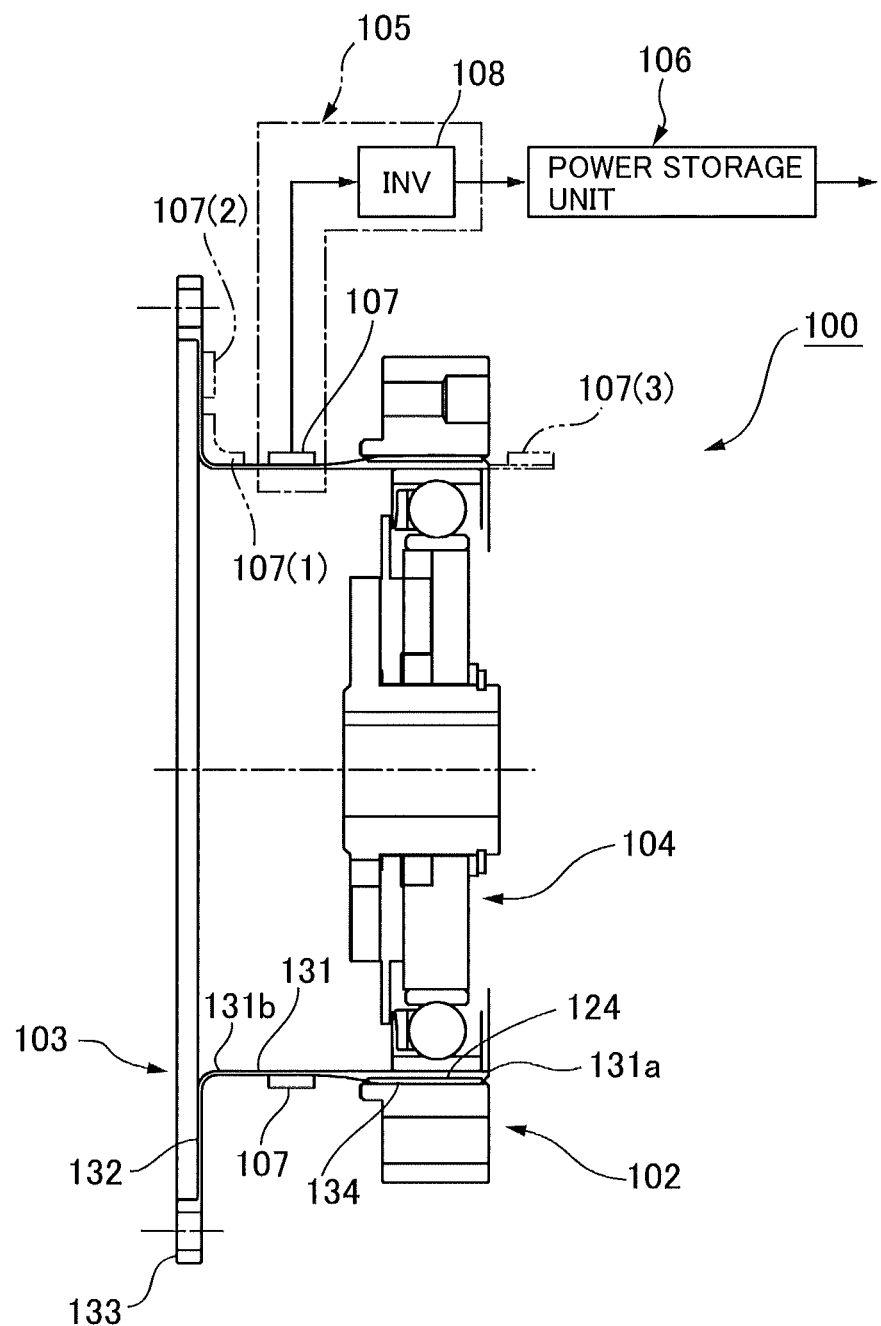
FIG. 4 A schematic diagram illustrating a silk hat-type strain wave gearing in which the present invention is applied.

FIG. 4 is a schematic view illustrating a silk hat-type strain wave gearing according to embodiment 2 in which the present invention is applied. The basic configuration of the silk hat-type strain wave gearing 100 is the same as the cup-type strain wave gearing 1, and is provided with a rigid internally toothed gear 102, a flexible externally toothed gear 103, and a wave generator 104. The flexible externally toothed gear 103 has a silk hat shape, and is provided with a flexible cylindrical part 131, a disk-form diaphragm 132 continuing on the rear end 131b thereof and spreading outward in the radial direction, an annular boss 133 continuing on the outer perimeter edge of the diaphragm 132, and external teeth 134 formed on a portion of the outer perimeter surface on the side of a front end opening 131a of the cylindrical part 131. The external teeth 134 are engageable with internal teeth 124 of the rigid internally toothed gear 102. The wave generator 104 having an ellipsoidal contour is fitted inside the portion where the external teeth are formed on the side of the front end opening 131a on the cylindrical part 131 of the flexible externally toothed gear 103. The amount of flexing outward or inward in the radial direction of the cylindrical part 131 being ellipsoidally flexed by the wave generator 104 gradually increases from the rear end 131b on the side of the diaphragm to the front end opening 131a.

A vibration-powered generator 105 is disposed on the flexible externally toothed gear 103, a power storage unit 106 for storing electric power generated by the vibration-powered generator 105 is connected to the vibration-powered generator, and electric power can be supplied from the power storage unit 106. The vibration-powered generator 105 is provided with a piezoelectric element 107 that is displaced to generate power by the flexing motion of the flexible externally toothed gear 103 being repetitively flexed accompanying rotation of the wave generator 104. The piezoelectric element 107 is affixed to a portion of the outer perimeter surface adjacent to the side of the diaphragm 132 relative to the external teeth 134 on the cylindrical part 131 of the flexible externally toothed gear 103, so as to flex integrally with the portion of the outer perimeter surface. For example, a plurality of piezoelectric elements 107 is affixed in the circumferential direction on the portion of the outer perimeter surface. The electric current generated by the piezoelectric element 107 is converted to DC current by way of an inverter 108 of the vibration-powered generator 105, and is then supplied to and stored in the power storage unit 106.

The positions where the piezoelectric element 107 are affixed on the flexible externally toothed gear 103 can be, for example, a portion 107(1) of the outer perimeter surface from the cylindrical part 131 to the diaphragm 132, and a portion 107(2) of the surface of the diaphragm 132, as indicated by the imaginary lines in FIG. 4. Or, the front end of the cylindrical part 131 can be extended forward from the external teeth 134, and the circular outer perimeter surface or circular inner perimeter surface of this extended portion can be used as a portion 107(3) where a piezoelectric element 107 is attached. Piezoelectric elements 107 can furthermore be attached to the circular inner perimeter surface of the cylindrical part 131 and the surface inside the diaphragm 132.

Embodiment 3

Figure 5:
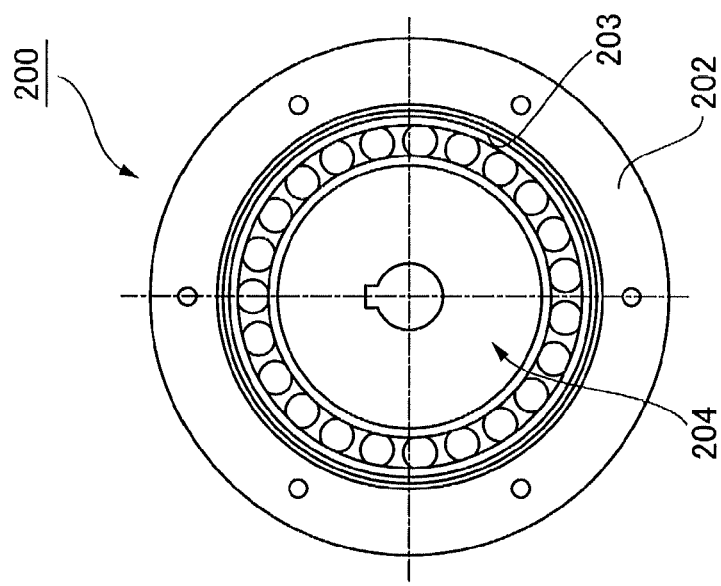
FIG. 5(a) and FIG. 5(b) A schematic diagram and front view illustrating a flat-type friction-coupling strain wave apparatus in which the present invention is applied.
Figure 5:
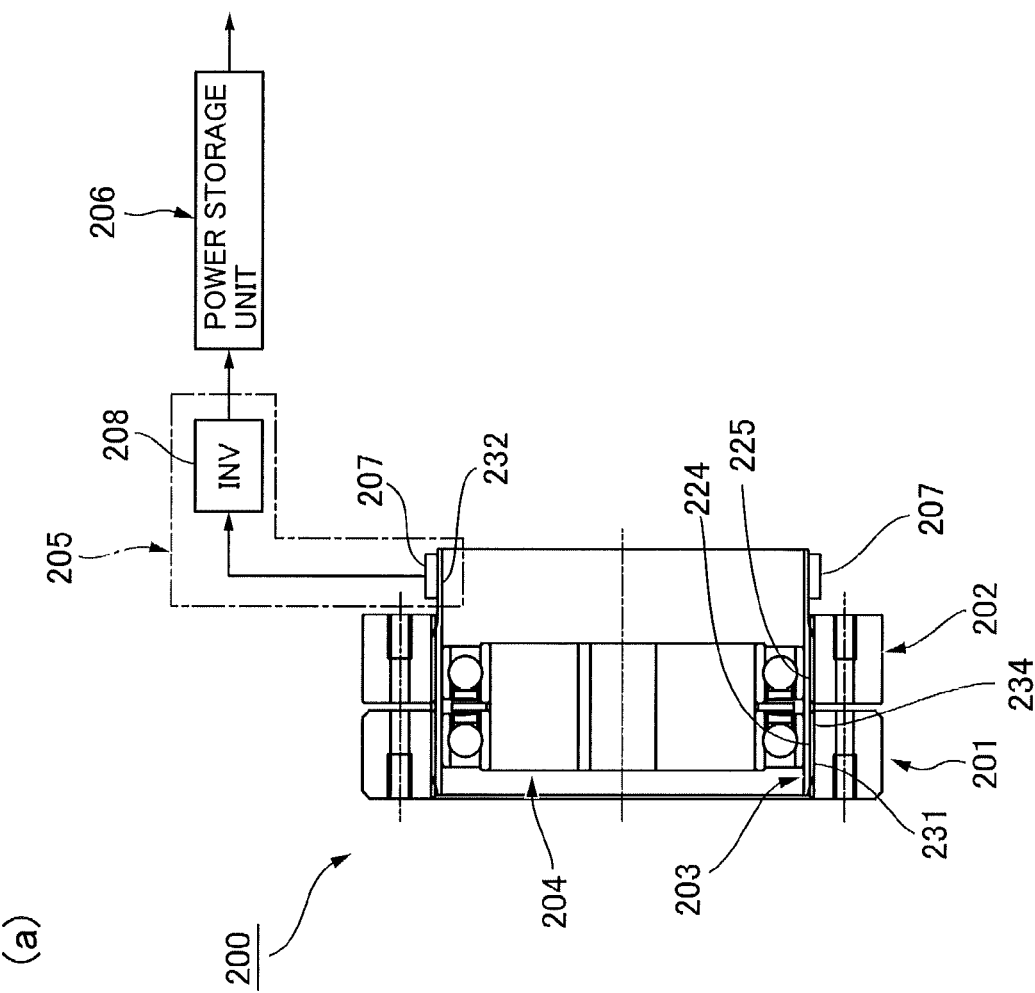

FIG. 5(a) is a schematic diagram of a flat-type friction-coupling strain wave apparatus according to embodiment 3 in which the present invention is applied, and FIG. 5(b) is a schematic front view of the same. The friction-coupling strain wave apparatus 200 is provided with annular first and second rigid rings 201 and 202, a flexible ring 203 disposed coaxially inside the first and second rigid rings 201 and 202, and a wave generator 204 having an ellipsoidal contour being fitted inside the flexible ring 203. The circular inner perimeter surfaces of the first and second rigid rings 201 and 202 are used respectively as first friction-coupling surfaces 224 and 225, and a friction-coupling surface 234 is formed also on the circular outer perimeter surface of the flexible ring 203.

The wave generator 204 ellipsoidally flexes the flexible ring 203, whereby the friction-coupling surface 234 of the flexible ring 203 partially friction-couples in the circumferential direction with the first and second friction-coupling surfaces 224 and 225 of the first and second rigid rings 201 and 202. These friction-coupling positions move circumferentially when the wave generator rotates 204.

Here, the circumferential length of the first friction-coupling surface 224 of the first rigid ring 201 is longer than the circumferential length of the friction-coupling surface 234 of the flexible ring 203; therefore, relative rotation corresponding to the difference in circumferential length occurs between the first rigid ring 201 and the flexible ring 203. As opposed to this, the circumferential length of the second friction-coupling surface 225 of the second rigid ring 202 is the same as the circumferential length of the friction-coupling surface 234 of the flexible ring 203; therefore, the second rigid ring 202 and the flexible ring 203 always rotate as one body without the occurrence of relative rotation between the two.

In the present example, the second rigid ring 202 is fixed to a fixed-side member not illustrated and is supported so as not to rotate, and the first rigid ring 201 is connected to a load-side member not illustrated. Accordingly, when the wave generator 204 is rotated at high speed by a motor, or the like, reduced-speed rotational output is extracted from the first rigid ring 201 and is transmitted to the load-side member.

Here, a vibration-powered generator 205 is disposed on the flexible ring 203, a power storage unit 206 for storing electric power generated by the vibration-powered generator 205 is connected to the vibration-powered generator 205, and electric power can be supplied from the power storage unit 206. The vibration-powered generator 205 is provided with a piezoelectric element 207 that is displaced to generate power by the flexing motion of the flexible ring 203 being repetitively flexed accompanying rotation of the wave generator 204, and an inverter 208 for converting the generated current to direct current and supplying the direct current to the power storage unit 206.

In the present example, the flexible ring 203 is provided with a flexible cylindrical part 231, a friction-coupling surface 234 formed on the outer perimeter surface thereof, and a cylindrical portion 232 extending (projecting) outward from the end on the second rigid ring 202 side of the cylindrical part 231. A plurality of piezoelectric elements 207 is affixed to the outer perimeter surface of the cylindrical portion 232. Piezoelectric elements 207 can also be affixed to the inner perimeter surface of the cylindrical portion 232.

Other Embodiments

The above examples include examples in which the present invention is applied to cup-type and silk hat-type strain wave gears, but the present invention is applicable likewise also to a flat-type strain wave gear.

The above examples include an example in which the present invention is applied to a flat-type friction-coupling strain wave apparatus, but the present invention is applicable likewise also to cup-type and silk hat-type friction-coupling apparatuses.

The invention claimed is:

1. A strain wave gearing having an annular rigid internally toothed gear, a flexible externally toothed gear that is disposed coaxially on an inside of the rigid internally toothed gear and is capable of flexing in a radial direction thereof, and a wave generator that is disposed coaxially on an inside of the flexible externally toothed gear; the flexible externally toothed gear being flexed in the radial direction by the wave generator and partially meshing with the rigid internally toothed gear; and, when a position at which the rigid internally toothed gear and the flexible externally toothed gear mesh moves in a circumferential direction thereof as the wave generator rotates, the gears rotating relative to each other in correspondence to a difference in number of teeth between the gears, wherein the strain wave gearing is:

the flexible externally toothed gear is provided with a vibration-powered generator; and the vibration-powered generator generates electric power by flexing motion of the flexible externally toothed gear that is repeatedly flexed as the wave generator rotates.

2. The strain wave gearing according to claim 1, wherein the vibration-powered generator is provided with a piezoelectric element that is displaced and generates electric power by the flexing motion of the flexible externally toothed gear, the flexible externally toothed gear being repeatedly flexed as the wave generator rotates.

3. The strain wave gearing according to claim 2, wherein the flexible externally toothed gear 3 has a flexible cylindrical part, a disk-form diaphragm extending from a rear end of the cylindrical part in the radial direction, and external teeth formed on a portion of an outer perimeter surface on a side of a front end opening of the cylindrical part, in which a portion of the side of the front end opening of the cylindrical part is flexed into a non-circular form by the wave generator; and the piezoelectric element is affixed to at least either one of the cylindrical part and the diaphragm of the flexible externally toothed gear.

4. The strain wave gearing according to claim 3, wherein the piezoelectric element is affixed to an outer perimeter surface of the cylindrical part of the flexible externally toothed gear.

5. The strain wave gearing according to claim 4, wherein the flexible externally toothed gear is a fixed side member supported so as not to rotate, and the rigid internally toothed gear is a rotation output member supported in a rotatable state.

6. The strain wave gearing according to claim 1, further comprising:

a power storage unit for storing electric power generated by the vibration-powered generator.

7. A friction-coupling strain wave apparatus having a rigid ring formed with a first friction-coupling surface on a circular inner perimeter surface thereof, a flexible ring that is disposed coaxially on an inside of the rigid ring and is formed with a second friction-coupling surface on a circular outer perimeter surface thereof, and a wave generator that is disposed coaxially on an inside of the flexible ring; the flexible ring being flexed in a radial direction thereof by the wave generator and partially friction-coupling with the rigid ring; and, when a position of friction-coupling of the rings moves in a circumferential direction as the wave generator rotates, the rings rotating relative to each other in correspondence to a difference in circumferential length of the first and second friction-coupling surfaces of the rings; wherein the friction-coupling strain wave apparatus is:

the flexible ring is provided with a vibration-powered generator; and the vibration-power generator generates electric power by a flexing motion of the flexible ring that is repeatedly flexed as the wave generator rotates.

8. The friction-coupling strain wave apparatus according to claim 7, wherein the vibration-powered generator is provided with a piezoelectric element that is displaced and generates electric power by the flexing motion of the flexible ring, the flexible ring being repeatedly flexed as the wave generator rotates.

9. The friction-coupling strain wave apparatus according to claim 8, wherein the flexible ring has a flexible cylindrical part, and a disk-form diaphragm extending from a rear end of the cylindrical part in the radial direction, in which the second friction-coupling surface is formed on a portion of an outer perimeter surface on a side of a front end opening of the cylindrical part, and a portion of the side of the front end opening of the cylindrical part is flexed into a non-circular form by the wave generator; and the piezoelectric element is affixed to at least either one of the cylindrical part and the diaphragm of the flexible externally toothed gear.

10. The friction-coupling strain wave apparatus according to claim 9, wherein the piezoelectric element is affixed to an outer perimeter surface of the cylindrical part of the flexible ring.

11. The friction-coupling strain wave apparatus according to claim 10, wherein the flexible ring is a fixed side member supported so as not to rotate, and the rigid ring is a rotation output member supported in a rotatable state.

12. The friction-coupling strain wave apparatus according to claim 7, further comprising:

a power storage unit for storing electric power generated by the vibration-powered generator.

* * * * *